No. 619,169. Patented Feb. 7, 1899.
T. M. HALL.
AIR BRAKE HOSE COUPLING.
(Application filed Apr. 19, 1898.)
(No Model.)
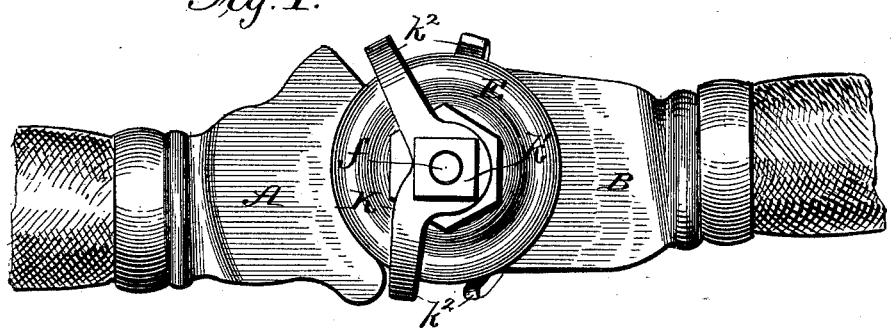
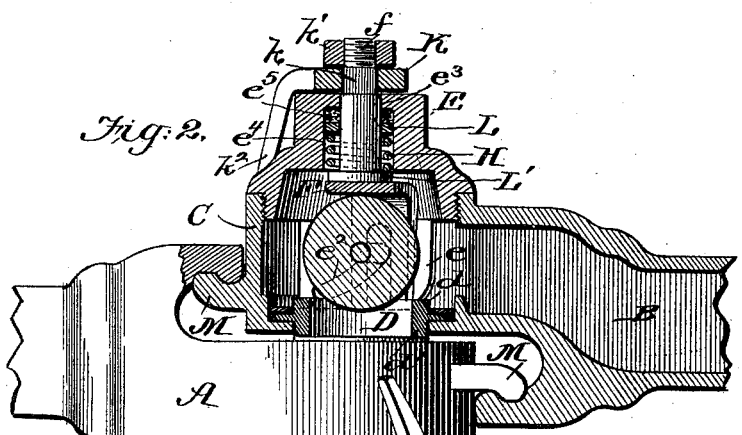
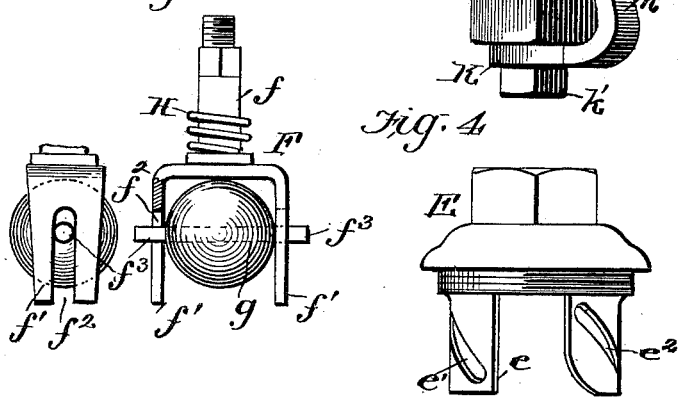
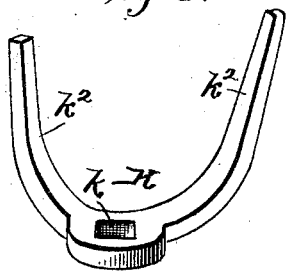
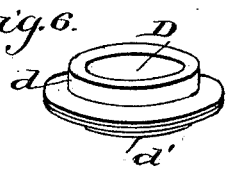
WITNESSES:
Jos. A. Ryan
F. S. Hitt
INVENTOR
Thaddeus M. Hall.
BY Munn & Co.
ATTORNEYS.

UNITED STATES PATENT OFFICE.

THADDEUS MANNING HALL, OF BONHAM, TEXAS.

AIR-BRAKE HOSE-COUPLING.

SPECIFICATION forming part of Letters Patent No. 619,169, dated February 7, 1899.

Application filed April 19, 1898. Serial No. 678,162. (No model.)

*To all whom it may concern:*

Be it known that I, THADDEUS MANNING HALL, a citizen of the United States, and a resident of Bonham, in the county of Fannin and State of Texas, have made certain new and useful Improvements in Automatic Air-Brake Hose-Lock Couplings, of which the following is a specification.

My invention relates to that class of couplings for the pipes of air-brakes in which the valves between the joints are opened when the pipes are connected and held open so long as the connection remains unbroken and the valves automatically seat themselves when the connection between the pipes is broken, whereby to prevent the escape of air, but when hose is pulled apart still leaves the valve open to work automatically.

The object of the invention is the construction of a lock for the air-brake valve which will be positive in its working, of few parts, and not liable to get out of order or to easily wear out.

With these ends in view the invention consists in the construction of certain parts and arrangement and combination of the same, which I shall first describe and then point out the novel features in the appended claims.

Reference is to be had to the accompanying drawings, forming a part of this specification, and in which similar reference characters designate corresponding parts in all the views.

Figure 1 is a plan view of the couplings in their locked position. Fig. 2 is a side elevation of the couplings in locked position, one of the couplings being shown in section. Fig. 3 is a view showing in detail the ball-valve and its operating-arm. Fig. 4 is a detail view illustrating the guideways for the axis of the valve. Fig. 5 is a detail view of the actuating-lever, and Fig. 6 is a detail view of the rubber valve-seat.

The two couplings A and B are each provided with a shell C, having a valve-seat D, formed of a disk or washer of rubber, with two projecting faces $d\ d'$, which form the contacting surface of both shells. Into the upper end of each shell is screwed or otherwise suitably secured the hollow nut E, having ears $e$ extending from its inner face, being preferably formed integral with the nut and each formed with a guideway $e'\ e^2$, said guideways being inclined in opposite directions, for a purpose hereinafter described. The top of the nut E is provided with an opening $e^3$, extending through its top, and in this opening is fitted the shank $f$ of the bifurcated or yoke-shaped operating-arm F. Each member $f'$ of the arm F is slotted, as at $f^2$, to receive the ends $f^3$ of a cross-pin or axis $g$, on which the spherical valve G is mounted. The members $f'$ of the arm F are located in the shell inside of and adjacent to the ears $e$ of the hollow nut F, and the ends of the axis $g$ after being received in the slots $f^2$ are inserted in the oppositely-inclined guideways $e'\ e^2$. Now it will be seen that when the arm F is turned the ends of axis $g$ will travel in the guideways $e'\ e^2$ and rise and descend in the slots $f^2$.

The nut E is of larger bore at $e^4$ to receive a rubber packing $e^5$ in order to make the nut air-tight, and inside the packing is a spring H, coiled around the shank $f$ and bearing between two washers L and L', with a tendency to force the arm F as far down in the shell as space will permit.

The shank $f$ is near its upper end polygonal in cross-section and is designed to receive an actuating-lever K, formed with a socket $k$, by which it is inserted on the shank, (being held in place by a nut $k'$,) and two curved arms $k^2$, which when the couplings are connected come in contact with the usual interlocking cam-shaped lugs M to turn the operating-arm F and raise or lower the ball-valve in the slots $f^2$.

Now it will be seen that in coupling the pipes, as shown in Figs. 1 and 2, the curved arms of the actuating-lever K come in contact with an end of one of the interlocking lugs 2 and is turned, thereby turning the operating-arm F in its bearing in the top of the hollow nut E and causing the ends of the axis $g$ to move in the slots $f^2$ toward the inner ends of the same, thus raising the valve off its seat. So long as the couplings are connected as described the valves will be kept open, and when they are uncoupled the reverse of the above movement of the parts takes place, the actuating-levers and operating-arms being turned in an opposite direction until the couplings become separated, at which time the valves will be seated and all escape of air prevented.

I am aware that it is not new to operate a valve of this character by causing its axis or cross pin to move in inclined guideways within the shell, and do not claim, broadly, this construction; but it is obvious that my device embraces advantageous and useful features not shown in any such device heretofore used. For instance, it will be noted that I have provided a ball-valve formed with a cross-pin or axis loosely mounted in slots in the operating-arm and inclined guideways within the shell. Now with such construction the valve being spherical will always adapt itself securely and accurately on the valve-seat, and it has been found by numerous experiments that the ball will rotate more in moving off the seat than in moving to it, or vice versa, whereby it always presents a new surface to the valve-seat every time it is seated thereon, and consequently will not wear away upon one side, but wears evenly and all around and lasts a considerable time.

Having thus described my invention, what I claim, and desire to secure by Letters Patent, is—

1. In a coupling of the character described, the combination with the shell provided with a valve-seat, of a ball-valve mounted within said shell and formed with a cross-pin or axis and means connected with said cross-pin or axis for variably rotating said ball to and from the valve-seat, as set forth.

2. In a coupling of the character described the combination of the shell provided with a valve-seat of a ball-valve mounted within said shell, and provided with a cross-pin or axis, a yoke-shaped arm straddling said ball and provided with slots receiving said cross-pin, and means substantially as described for rotating and sliding said cross-pin in said slots, as set forth.

3. In a coupling of the character described, the combination with the shell provided with a valve-seat of a hollow nut secured to said shell and provided with ears extending within the same, and formed with oppositely-inclined guideways, a yoke-shaped operating-arm mounted to turn in said shell and having its members adjacent said ears and formed with longitudinal slots, and a ball-valve having a cross-pin or axis loosely inserted through said slots and into said guideways, as set forth.

4. In a coupling of the character described the combination with the two interlocking shells formed with valve-seats of ball-valves mounted within said shells, and rotatable supports connected with said balls whereby they are caused to variably rotate to and from said valve-seats when the couplings are joined to or disconnected from each other, as and for the purpose set forth.

5. In a coupling of the character described, the combination with the shell provided with a valve-seat, of a ball-valve mounted in said shell and a rotatable support in which said ball-valve is held, the said support causing the ball to rotate to and from the valve-seat when the said support is rotated, as set forth.

THADDEUS MANNING HALL.

Witnesses:
R. D. POTTS,
MILTON T. PAULLIN.